(12) United States Patent
Chang et al.

(10) Patent No.: US 9,077,499 B2
(45) Date of Patent: Jul. 7, 2015

(54) AUTOMATIC POWER SAVING FOR COMMUNICATION SYSTEMS

(75) Inventors: Chun-Che Chang, Hsinchu (TW); Sam Mungall, Hsinchu (TW); Ravi Mantri, Portland, OR (US)

(73) Assignee: Metanoia Communications Inc. (TW)

( * ) Notice: Subject to any disclaimer, the term of this patent is extended or adjusted under 35 U.S.C. 154(b) by 372 days.

(21) Appl. No.: 13/524,976

(22) Filed: Jun. 15, 2012

(65) Prior Publication Data

US 2012/0324262 A1 Dec. 20, 2012

Related U.S. Application Data

(60) Provisional application No. 61/497,507, filed on Jun. 15, 2011.

(51) Int. Cl.
*G06F 1/32* (2006.01)
*H04L 5/00* (2006.01)
*H04L 27/26* (2006.01)
*H04L 27/34* (2006.01)

(52) U.S. Cl.
CPC ............ *H04L 5/0053* (2013.01); *G06F 1/3203* (2013.01); *G06F 1/3278* (2013.01); *H04L 5/0007* (2013.01); *H04L 5/0058* (2013.01); *H04L 27/2614* (2013.01); *H04L 27/3411* (2013.01); *Y02B 60/126* (2013.01)

(58) Field of Classification Search
CPC ......................................................... G06F 1/32

USPC .......................................................... 713/320
See application file for complete search history.

(56) References Cited

U.S. PATENT DOCUMENTS

| 6,067,626 | A * | 5/2000 | Watanabe | 713/310 |
| 8,719,384 | B2 * | 5/2014 | Lambert et al. | 709/220 |
| 2007/0287456 | A1 * | 12/2007 | Shimizu | 455/435.1 |
| 2010/0112960 | A1 * | 5/2010 | Shao et al. | 455/73 |
| 2011/0074850 | A1 * | 3/2011 | Walmsley et al. | 347/12 |
| 2012/0204074 | A1 * | 8/2012 | Schoppmeier et al. | 714/749 |
| 2012/0278849 | A1 * | 11/2012 | Gholmieh et al. | 725/126 |

* cited by examiner

*Primary Examiner* — Thomas Lee
*Assistant Examiner* — Volvick Derose
(74) *Attorney, Agent, or Firm* — Han IP Corporation; Andy M. Han

(57) ABSTRACT

Various embodiments of a power saving scheme in data communication are provided. In one aspect, a method transmits a plurality of symbols each of which containing an overhead portion and at least a portion of a respective data transmission unit (DTU). In particular, the method transmits the overhead portion of a first symbol of the plurality of symbols and the at least a portion of a respective DTU of the first symbol when the at least a portion of the respective DTU of the first symbol contains payload data. The method transmits the overhead portion of a second symbol of the plurality of symbols without transmitting the at least a portion of a respective DTU of the second symbol when the at least a portion of the respective DTU of the second symbol contains no payload data.

20 Claims, 11 Drawing Sheets

AUTOMATIC POWER SAVING FOR COMMUNICATION SYSTEMS

CROSS REFERENCE TO RELATED PATENT APPLICATION

This application claims the priority benefit of U.S. Provisional Patent Application No. 61/497,507, filed Jun. 15, 2011, which is hereby incorporated by reference in its entirety.

BACKGROUND

1. Technical Field

The present disclosure relates to data communication. More specifically, certain embodiments of the present disclosure relate to a method and apparatus to enable automatic power saving for communication systems.

2. Description of Related Art

With the rise of the Internet and fast development of communication technologies, more and more electronic communications, network-based business transactions and other forms of online data communications result in an ever-rising volume of network traffic. In particular, networks of various sizes including the Internet are supported by network devices that communicate with one another over a variety of physical mediums such as twisted-pair phone lines, coaxial cable, power line, optical fiber and Ethernet cable, for example. As network devices require electrical power to operate whether or not the network device is transmitting signals with payload data, it is desirable to reduce the power consumed by networking devices especially in view of the global trend of conservation of energy.

For data communications based on the Digital Subscriber Line technologies (sometimes summarized as xDSL), such as for example Very-high-speed DSL (VDSL), VDSL2, Asymmetric DSL 2 (ADSL2) and ADSL2+, power efficiency is an important issue that needs to be resolved. This is also important for xDSL-like approach to be adopted by G.fast. One approach that attempts to achieve reduction in power consumption requires adding various power states such as L2 or L1. However, such approach tends to add complexity to xDSL systems without significant rewards and works only in specific situations.

Therefore, there is a need for an alternative approach that can result in significant reduction in power consumption and is not complex in terms of implementation.

SUMMARY

Various embodiments of an automatic power-saving scheme in xDSL-based data communications are provided. The proposed scheme enables the automatic switching between power states. Moreover, the total power consumption of the transmitter of a networking device will be approximately proportional to the actual user traffic.

According to one aspect, a method to save power in data communication is provided. The method may comprise: transmitting a plurality of symbols each of which contain an overhead portion and at least a portion of a respective data transmission unit (DTU) by: transmitting the overhead portion of a first symbol of the plurality of symbols and the at least a portion of a respective DTU of the first symbol when the at least a portion of the respective DTU of the first symbol contains payload data; and transmitting the overhead portion of a second symbol of the plurality of symbols without transmitting the at least a portion of a respective DTU of the second symbol when the at least a portion of the respective DTU of the second symbol contains no payload data.

In one embodiment, each symbol may contain a respective plurality of DTUs. Transmitting the overhead portion of a second symbol of the plurality of symbols without transmitting the at least a portion of a respective DTU of the second symbol when at least a portion of the respective DTU of the second symbol contains no payload data may comprise transmitting the overhead portion of the second symbol without transmitting the respective plurality of DTUs of the second symbol when each of the respective plurality of DTUs of the second symbol contains no payload data.

In one embodiment, the transmitting may comprise transmitting in accordance with Very-high-speed Digital Subscriber Line 2 (VDSL2) standards.

In one embodiment, the method may further comprise determining whether or not a first DTU that corresponds to one or more of the plurality of symbols contains no payload data; and marking the first DTU to indicate the first DTU as containing no payload data when it is determined that the first DTU contains no payload data. Marking the first DTU may comprise setting a value of a sequence identification (SID) in the overhead portion of the first DTU to 255. Alternatively, marking the first DTU may comprise setting a value of a time stamp (TS) in the overhead portion of the first DTU to 255 and a value of a sequence identification (SID) in the overhead portion of the first DTU to 255.

In another embodiment, the method may further comprise setting a value of a sequence identification (SID) or both a value of a time stamp (TS) and a value of the SID in the overhead portion of each symbol to indicate a nature of content of the at least a portion of a respective DTU of each symbol. The value of the SID may be set to 255, or that both the value of the TS may be set to 255 and the value of the SID may be set to 255, to indicate the at least a portion of a respective DTU of a symbol as containing no payload data. Alternatively, the value of the TS may be set to 255 and the value of the SID may be set to 254 to indicate the at least a portion of a respective DTU of a symbol will be transmitted once and not stored in a retransmission queue or a transmitter.

According to one other aspect, another method to save power in data communication is provided. The method may comprise: defining a second DTU such that the second DTU carries a first data packet that corresponds to a first DTU and a second data packet that corresponds to the second DTU; and transmitting the first DTU and the second DTU with the first DTU carrying no payload data and with the second DTU carrying the first data packet and the second data packet as payload data.

In one embodiment, the first data packet may correspond to the first DTU and a third DTU. The first DTU, the second DTU, and the third DTU may be transmitted with the first DTU and the third DTU carrying no payload data and with the second DTU carrying the first data packet and the second data packet as payload data.

In another embodiment, the first data packet and the second data packet may comprise first and second Voice over Internet Protocol (VoIP) data packets.

According to yet another aspect, a networking device is provided. The networking device may comprise a communication unit and a communication unit coupled to the communication unit. The communication unit may be configured to transmit a plurality of symbols each of which containing an overhead portion and at least a portion of a respective DTU by: transmitting the overhead portion of a first symbol of the plurality of symbols and the at least a portion of a respective DTU of the first symbol when the at least a portion of the respective DTU of the first symbol contains payload data; and transmitting the overhead portion of a second symbol of the plurality of symbols without transmitting the at least a portion of a respective DTU of the second symbol when the at least a portion of the respective DTU of the second symbol contains no payload data.

In one embodiment, each symbol may contain a respective plurality of DTUs. The communication unit may transmit the overhead portion of the second symbol without transmitting the respective plurality of DTUs of the second symbol when each of the respective plurality of DTUs of the second symbol contains no payload data.

In one embodiment, the communication unit may be further configured to determine whether or not a first DTU that corresponds to one or more of the plurality of symbols contains no payload data; and mark the first DTU to indicate the first DTU as containing no payload data when it is determined that the first DTU contains no payload data. The communication unit may mark the first DTU by setting a value of a SID in the overhead portion of the first DTU to 255. Alternatively, the communication unit may mark the first DTU by setting a value of a TS in the overhead portion of the first DTU to 255 and a value of an SID in the overhead portion of the first DTU to 255.

In another embodiment, the communication unit may be further configured to define a second DTU such that the second DTU carries a first data packet that corresponds to a first DTU and a second data packet that corresponds to the second DTU; and transmit the first DTU and the second DTU with the first DTU carrying no payload data and with the second DTU carrying the first data packet and the second data packet as payload data. The first data packet may correspond to the first DTU and a third DTU. The first DTU, the second DTU, and the third DTU may be transmitted with the first DTU and the third DTU carrying no payload data and with the second DTU carrying the first data packet and the second data packet as payload data. The first data packet and the second data packet may comprise first and second Voice over Internet Protocol (VoIP) data packets.

According to still another aspect, a method to save power in data communication is provided. The method may comprise: receiving a plurality of data packets over a predetermined duration during which a plurality of data transmission units (DTUs) can be formed such that the data packets are received at points in time during the predetermined duration that correspond to formation of more than one of the DTUs; forming the plurality of DTUs by filling the plurality of data packets into one or more of the DTUs and filling an idle pattern into remaining one or more of the DTUs; and transmitting the plurality of DTUs.

In one embodiment, the predetermined duration may comprise a maximum allowable physical layer delay.

In another embodiment, transmitting the plurality of DTUs may comprise transmitting the one or more DTUs filled with the idle pattern before transmitting the one or more DTUs filled with the plurality of data packets.

In yet another embodiment, transmitting the plurality of DTUs may comprise muting sub-carriers that carry the one or more DTUs filled with the idle pattern.

BRIEF DESCRIPTION OF THE DRAWINGS

The present disclosure will become more readily apparent to those ordinarily skilled in the art after reviewing the following detailed description and accompanying drawings.

DETAILED DESCRIPTION OF THE PREFERRED EMBODIMENTS

Overview

Figure 1:
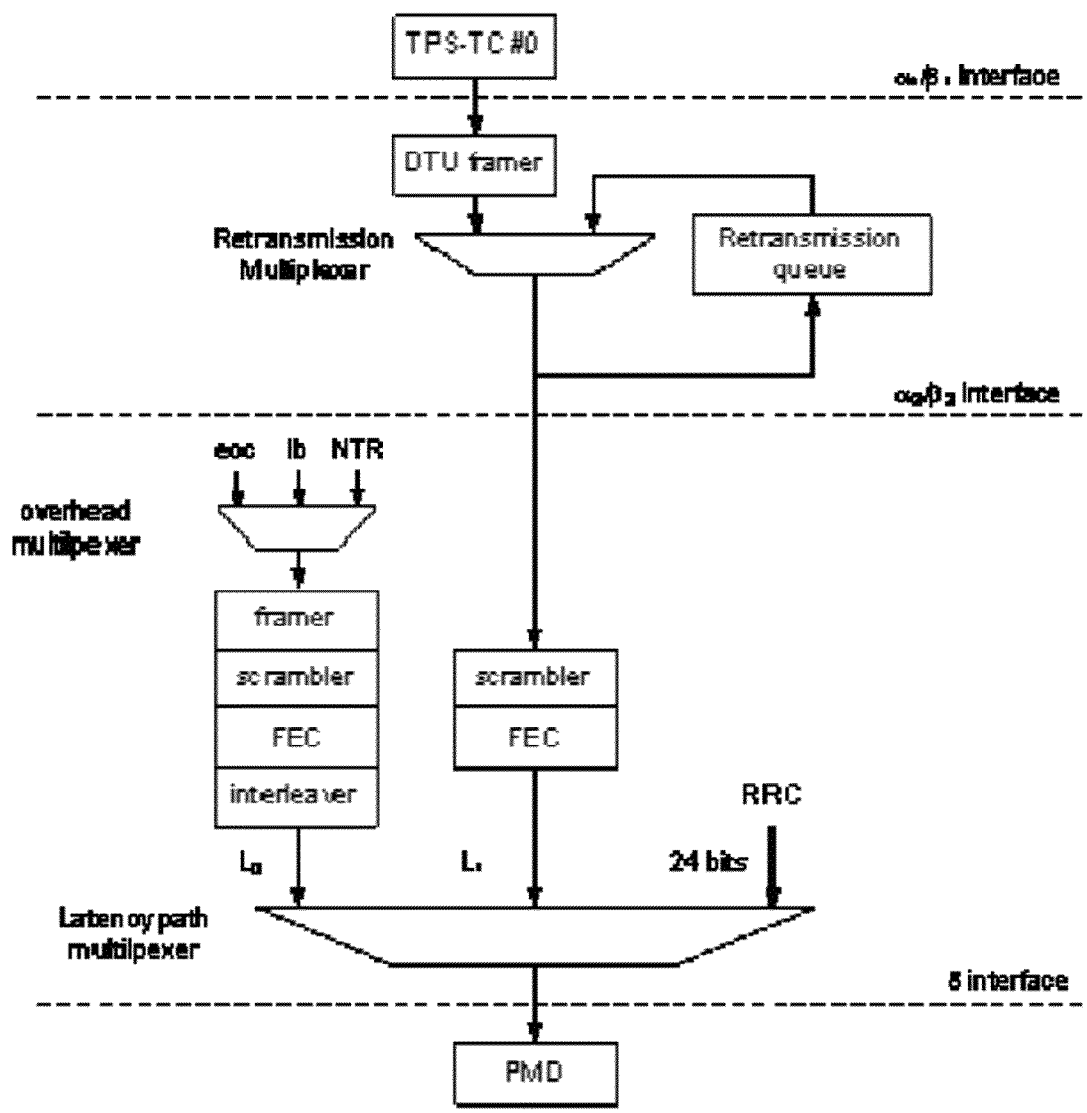
FIG. 1 is a block diagram of a retransmission functional model in accordance with one embodiment of the present disclosure.

Various embodiments of an automatic power-saving scheme for digital communication systems, such as for example orthogonal frequency-division multiplexing (OFDM) systems, are provided. According to the present disclosure, bits that are to be transferred over a link may be classified as quiet or non-quiet types depending on the content of the bits. In the present disclosure, a bit that is not associated with user data traffic and is generated to match the rate between higher layers and physical layer delivery mechanism is called a "quiet bit". A bit associated with user data traffic is called a "non-quiet bit". When mapping the OFDM constellations, if the constellation is generated from quiet bits or bits derived from quiet bits, and provided that the receiver will not be adversely affected, the constellation points may be forced to [0, 0] for those sub-carriers. This will result in a net reduction in the total power transmitted and power consumed by the transmitting device since transmitting [0, 0] does not require any energy on the sub-carrier. Further reductions in power consumption may be possible by shutting down hardware units at the transmitter or receiver when quiet bits and the corresponding sub-carriers are processed.

Examples of communication systems where the power-saving scheme of the present disclosure may be applicable include, but are not limited to, OFDM-based communication systems, xDSL systems such as ADSL (ITU-T G.992.x) and VDSL (ITU-T G.993.x), g.INP (a.k.a. ITU-T G.998.4), g.hn (a.k.a. ITU-T G.9961/G.9960), IEEE P1901, Homeplug, MOCA, and IEEE 802.11 systems.

Under the power-saving scheme of the present disclosure, a number of rules are observed and are provided below.

(1) Input bits are processed and mapped to constellation points with real and imaginary components over a number of sub-carriers.

(2) Input bits and all system bits that affect the mapping to the sub-carriers have a per-bit quiet status indicator attached.

(3) Bits derived from operations over quiet only input bits shall generally be classified as quiet bits.

(4) In some operations with quiet only input bits, derived quiet bits may be converted to non-quiet bits. In some operations with non-quiet bits, derived non-quiet bits may be converted to quiet bits.

(5) Bits derived from operations with non-quiet only inputs shall generally be classified as non-quiet bits.

(6) Bits derived from operations with quiet and non-quiet inputs shall generally be classified as non-quiet bits.

(7) In some operations with quiet and non-quiet bits, non-quiet bits may be converted to quiet bits.

(8) When mapping bits to constellations, if only quiet bits are mapped to a sub-carrier then [0, 0] may be mapped to that sub-carrier.

(9) In some cases sub-carriers that are generated only from quiet bits may transmit the original constellation point without forcing it to [0, 0]. The transmission of the original constellation point without forcing it to [0, 0] in such cases may be based on a request from the receiver.

The goal of the disclosed mechanism is that when there is idle traffic, i.e., traffic not generated by higher layers but generated for rate matching like ATM/PTM idle cells, such idle traffic may be assigned the quiet status, thus resulting in power savings due to not transmitting on sub-carriers that are supposed to carry this traffic. On the receiver end, it is possible to reconstruct the user traffic and filter out the idle traffic.

Depending on the application or application layer used in a standard, the status of bits may be grouped together leading to further optimization. In one embodiment, byte-based systems or layers may have per-byte quiet/non-quiet status indication. In another embodiment, codeword-based systems may have per-codeword quiet/non-quiet status indication. In yet another embodiment, retransmission systems supporting g.INP may have per-DTU quiet/non-quiet status indication.

Depending on operations used in a standard, several individual operations may be grouped together leading to further optimization and simplification. In these cases, the entire composite operation may operate on a group of bits and change the status of a group of output bits depending on status of all bits in the input group. In one embodiment, in the context of Reed-Solomon (RS) parity generation, if all input bytes are quiet then the whole codeword may be classified as quiet, otherwise the whole codeword may be classified as non-quiet. It is noteworthy that if forward error correction (FEC) information bytes contain a mixture of quiet and non-quiet bytes, then all quiet bytes may be re-classified as non-quiet to allow proper decoding at the receiver. In another embodiment, in the context of DTU formation, if at least one complete or partial input packet transmission mode (PTM) cell in a DTU is non-quiet, then the DTU as a whole may be assigned non-quiet status.

Regarding initial status classification, the following are some examples in which quiet status may be asserted: FEC codewords that contain only idle data as payload, idle PTM cells, idle asynchronous transfer mode (ATM) cells, DTUs in g.inp that contain only idle PTM or ATM cells, link protocol data units (LPDUs) in g.hn that contain dummy or padding payload data, and high-level data link control (HDLC) idle bytes.

Under the power-saving scheme of the present disclosure, a concept of "quiet forcing", with reference to rule (7) above, is provided and is further explained herein. Some operations in communication systems involve feedback loops which may result in generation of non-quiet bits at the output due to state propagation, even when the input to the system is quiet bits (referring to rule (6) above). The receiver may only require a fixed number of iterations of the feedback loop to reconstruct the non-quiet traffic, in which case it may be beneficial to force the status of all bits in the feedback loop to quiet after the input has transitioned to quiet bits and a certain number of iterations have elapsed. As an example, trellis coding operation using a convolutional encoder, operating over multiple latency paths with latency paths carrying non-quiet bits multiplexed first, may be forced to a quiet state of the convolutional encoder after certain number of quiet only sub-carriers, i.e., sub-carriers for which the input data has quiet status indication. As another example, a VDSL or ADSL data scrambler may be forced to transition from non-quiet to quiet state after certain number of quiet only input bits.

Under the power-saving scheme of the present disclosure, a concept of 'non-quiet forcing', with reference to rule (4) above, is provided and is further explained herein. Some operations in communication systems involve feedback loops in which the correct internal status is required by the receiver for it to be able to decode the input correctly. If there is quiet to non-quiet transition at the input of such a feedback loop, which is currently in a quiet internal state, there may be a fixed number of iterations before the receiver will be able to correctly decode the non-quiet data, in which case it may be preferable to assert the internal status to non-quiet in advance. As an example, a VDSL data scrambler may be forced to transition from quiet to non-quiet state in advance of getting non-quiet input bits.

On the receiver end, the constellation points are demodulated and then decoded to reconstruct the original data sent by the transmitter. Data bits that were asserted as non-quiet at the transmitter will be unaffected and so should be recoverable at the receiver. Data bits that were asserted as quiet at the transmitter may be decoded incorrectly at the receiver, and may be: (1) identified and dropped, (2) passed on to higher layers as corrupt data, or (3) converted into an appropriate type (e.g., idle ATM cells or PTM cells if supported by the higher layer) that can be transferred to the upper layer. In one embodiment, the receiver may make some form of estimation as to whether the transmitter has switched to transmitting quiet bits or groups and take appropriate measures to filter the quiet related data, or disable processing units so as to further save power or both.

First Illustrative Embodiments

Figure 2:
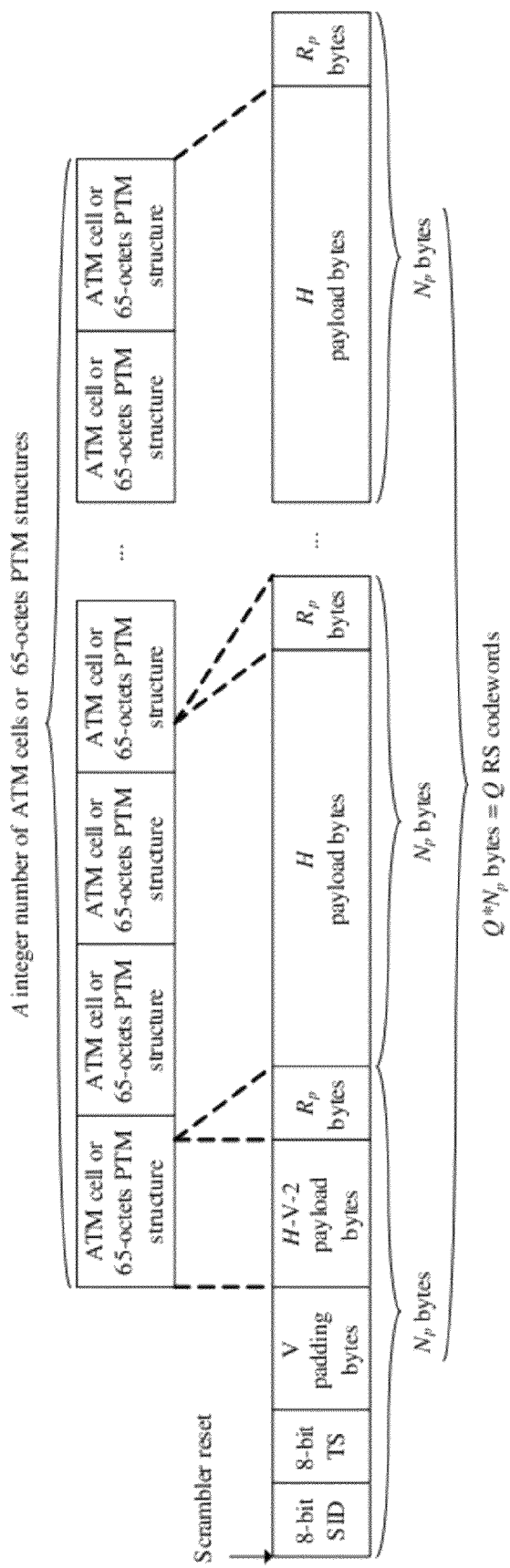
FIG. 2 illustrates packing of cells into DTUs in accordance with one embodiment of the present disclosure.
Figure 3:
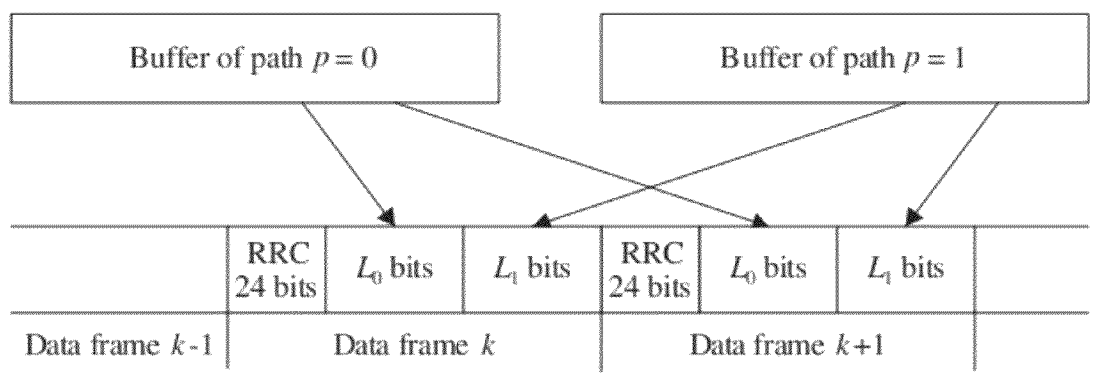
FIG. 3 illustrates a symbol frame structure in accordance with the g.INP standard in accordance with one embodiment of the present disclosure.

FIG. 1 is a block diagram of a retransmission functional model 100 in accordance with one embodiment of the present disclosure. FIG. 2 illustrates packing of cells into DTUs in accordance with one embodiment of the present disclosure. FIG. 3 illustrates a symbol frame structure in accordance with the g.INP standard in accordance with one embodiment of the present disclosure.

The following description refers to FIGS. 1, 2 and 3, and pertains to embodiments of implementation of the power-saving scheme of the present disclosure as applied to a currently existing OFDM-based communication system, specifically ADSL or VDSL with Framer type 1 g.INP support.

In the example shown, the input is ATM or PTM cells (referred to as cells hereinafter) from the Transport Protocol Specific-Transmission Convergence (TPS-TC) layer #0 (FIG. 1). According to these standards, both types of cells have an "idle" type that is used as for padding when there is no user data traffic available for transmission. In one embodiment, idle cells may be classified as quiet groups while all other cells may be classified as non-quiet groups. In the DTU framer, DTUs are constructed from cells (FIG. 2). In one embodiment, each DTU may be classified as a single quiet or non-quiet group. In another embodiment, DTUs with only idle cells may be marked with a special sequence identification (SID) and time stamp (TS), and the those DTUs may be classified as quiet. All other DTUs may be classified as non-quiet. In one embodiment, bits from overhead latency path (L0) and receiver return channel (RRC) may be classified as non-quiet. All latency paths and RRC may be multiplexed on single symbol (FIG. 3). L0 and RRC bits may be classified as non-quiet as they are derived from non-quiet bits. Optionally, latency path L1 bits may be classified as a single group.

In one embodiment, if the L1 bits are classified as a single group, then it may be classified as a quiet group if all bits are from quiet DTUs; otherwise it may be classified as a non-quiet group. In one embodiment, if trellis is disabled then rule (8) above may be used when mapping bits to constellations for both grouped and non-grouped L1 bits. In another embodiment, if trellis is enabled and L1 bits are grouped as a single class, then 'quiet forcing" may be carried out to force the trellis state machine to the quiet state after a certain number of sub-carriers (e.g., N) after mapping the RRC and L1 bits, where N is chosen to be sufficiently large to allow decoding at the receiver. In yet another embodiment, if trellis is enabled and L1 bits are not grouped as a single class, then 'quiet forcing" and 'non-quiet forcing' may be carried out to put the trellis encoder in a state that allows proper decoding of the non-quiet bits by the receiver. Pilot tones, if present, may be transmitted as required.

Second Illustrative Embodiments

Figure 4:
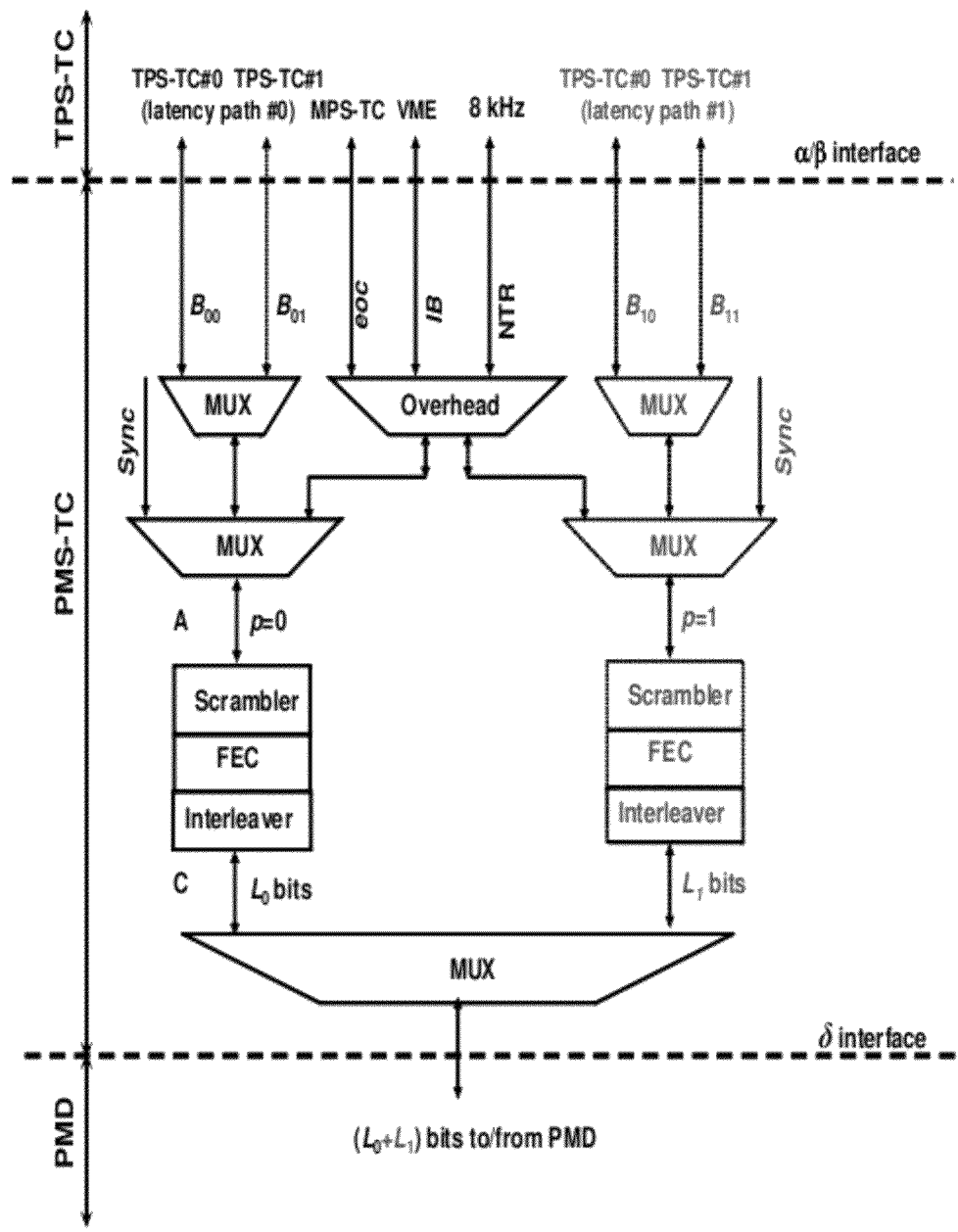
FIG. 4 is a block diagram of a retransmission functional model in accordance with another embodiment of the present disclosure.

FIG. 4 is a block diagram of a retransmission functional model 400 of a networking device in accordance with another embodiment of the present disclosure. FIG. 4 illustrates how the power-saving scheme may be applied to a currently existing OFDM-based communication system, such as a VDSL system based on ITU-T Recommendation G.993.2.

Figure 5:
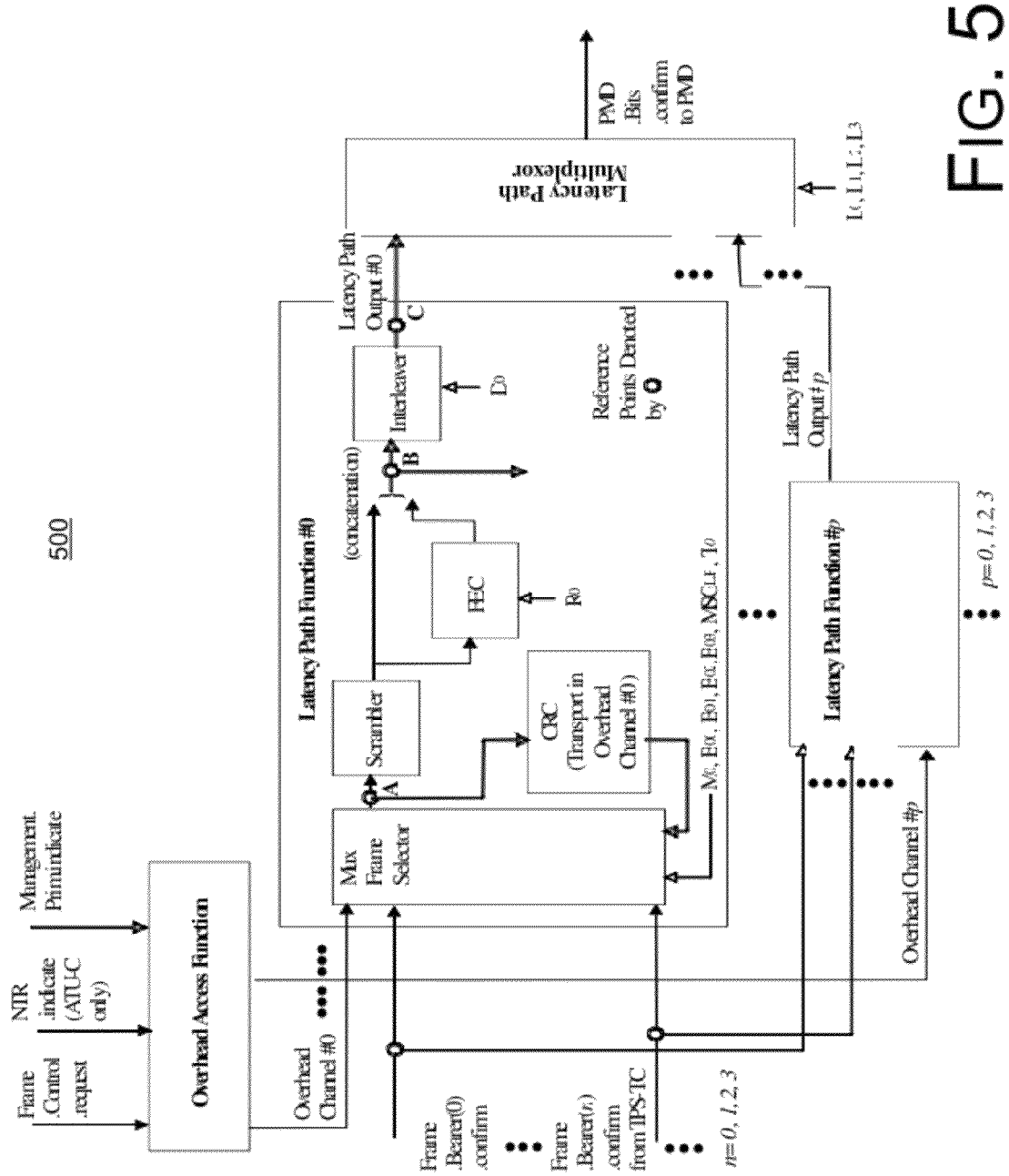
FIG. 5 is a block diagram of a retransmission functional model in accordance with yet another embodiment of the present disclosure.

FIG. 5 is a block diagram of a retransmission functional model 500 of a networking device in accordance with yet another embodiment of the present disclosure. FIG. 5 illustrates how the power-saving scheme may be applied to a currently existing OFDM-based communication system, such as an ADSL system based on ITU-T Recommendation G.992.x.

The following description refers to FIGS. 4 and 5, and pertains to embodiments of implementation of the power-saving scheme of the present disclosure as applied to a currently existing OFDM-based communication system, specifically a VDSL system based on ITU-T Recommendation G.993.2 and an ADSL system based on ITU-T Recommendation G.992.x.

In the example shown, the input is ATM or PTM cells from TPS-TC #0 and TPS-TC #1. According to these standards, both types of cells have an 'idle' type that is used for padding, when there is no user data traffic available for transmission. In one embodiment, an idle cell may be classified as a single quiet group while all other cells may be classified as non-quiet groups. Bits from overhead may be classified as non-quiet. In one embodiment, after FEC codeword calculation, the output codewords may be classified as single groups. If information bytes of the codewords contain only data from idle cells and no overhead bytes, they may be classified as quiet groups; otherwise they may be classified as non-quiet groups. All latency paths may be multiplexed on a single symbol, as shown in FIG. 4 and FIG. 5. In one embodiment, payload bits, i.e., those that do not come from the overhead multiplexer above, in L0 may optionally be classified as a single group. In another embodiment, payload bits in L1 may optionally be classified as a single group.

In one embodiment, if the payload L0/L1 bits are classified as a single group, then it may be classified as a quiet group if all bits are from idle cells; otherwise it may be classified as a non-quiet group. In one embodiment, if trellis is disabled then rule (8) above may be used when mapping bits to constellations for both grouped and non-grouped bits. In one embodiment, if trellis is enabled and payload L0/L1 is grouped as a single class, 'quiet forcing' may be used to force the trellis state machine to the quiet state after a certain number of sub-carriers (say N) after mapping the overhead bytes, where N is chosen to be sufficiently large to allow decoding at the receiver. In another embodiment, if trellis is enabled and payload L0/L1 is not grouped as a single class, 'quiet forcing' and 'non-quiet forcing' may be used to put the trellis encoder in a state that allows proper decoding of the non-quiet bits by the receiver. The above description applies when there is no interleaving applied. In the interleaved mode, the quiet/non-quiet status indicator bits are maintained at the output of the interleaver. The grouping of the bits is done based on the status of bits at the output of the interleaver and the mapping to sub-carriers is then done as described above. Pilot tones, if present may be transmitted as required.

Third Illustrative Embodiments

Figure 6:
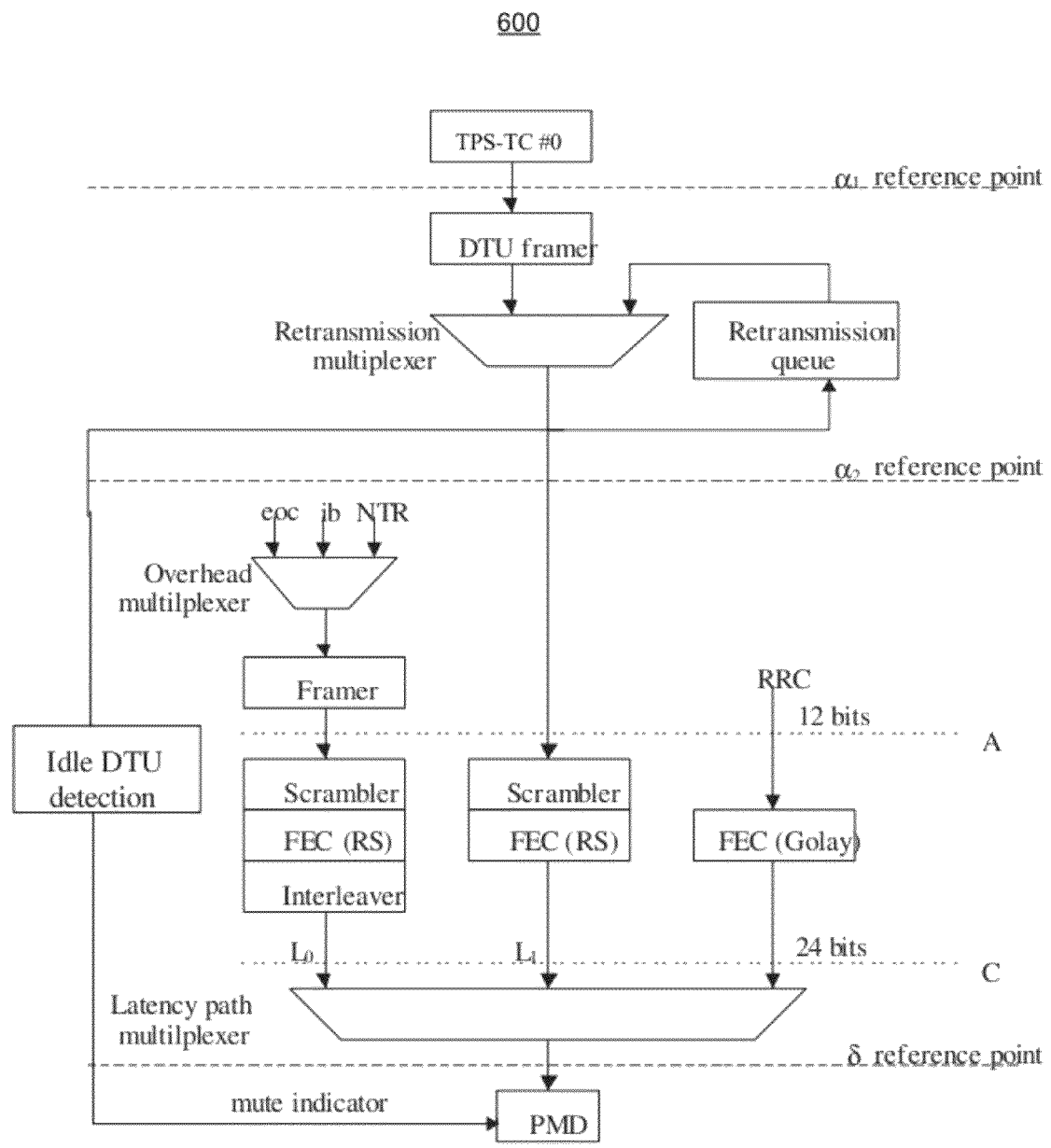
FIG. 6 is a block diagram of a retransmission functional model in accordance with still another embodiment of the present disclosure.

FIG. 6 is a block diagram of a retransmission functional model 600 of a networking device in accordance with still another embodiment of the present disclosure. As shown in FIG. 6, idle DTUs are generated by the DTU framer when no payload data is present and are identified at the physical media dependent (PMD) sublayer by an indicator.

When user data traffic is low or bursty, often times there are DTUs that contain only idle patterns (e.g., no payload data). Significant reduction in power consumption can be achieved by sending quiet over symbols when only such DTUs are available for transmission. Ideally, turning line driver off completely during these periods of time can lead to the greatest power saving. However, doing so would also shut the embedded overhead portion channel (EOC) off and may affect neighboring loops. The proposed power-saving scheme marks DTUs with idle patterns to indicate such DTUs as idle DTUs. Normally, the idle DTUs would still be transmitted. Under the proposed power-saving scheme, however, the idle DTUs would not be transmitted. As a result, the output power is approximately proportional to the number of DTUs that are transmitted, and hence power consumption is reduced.

There may be several ways to mark idle DTUs to indicate such DTUs as idle DTUs. In one embodiment, a reserved TS value of 255 is used as a delimiter of special DTUs. For example, by setting TS=255 and setting SID=255, these values of TS and SID can mark a DTU as an idle DTU carrying no payload data. The contents of this type of DTU are idle cells in ATM mode and bytes 0xF0 in 64/65 PTM mode. Accordingly, reduction in power consumption can be achieved by "muting" the payload latency path in symbols that only contain DTUs with TS=255 and SID=255 (i.e., all idle patterns). The term "muting" herein refers to transmitting no power on sub-carriers mapped to the payload latency path such as, for example, mapping QAM point [0, 0] onto those sub-carriers.

Alternatively, by setting TS=255 and SID=254, these values of TS and SID can mark a DTU that will be sent out by the transmitter only once and not stored in the transmitter's retransmission queue. For TS=255 and SID=0~253, these SID values can be reserved for future use.

In another embodiment, idle DTUs may be marked as idle DTUs with repartitioned SID. More specifically, idle DTUs can be marked by setting the value of respective SID to 255. In other embodiments other combinations of different values of TS and/or SID may be used to mark idle DTUs to indicate such DTUs as idle DTUs.

Referring to FIG. 6, each symbol is treated as an abstract container. Symbols are transmitted continuously over time. In VDSL systems, for example, symbols are transmitted 4,000 times per second or 8,000 times per second. According to the g.INP standard, in addition to pilots, each symbol has a fixed field for RRC, an embedded overhead portion channel (EOC) running on one latency path over some sub-carriers and a second latency path that carriers DTUs over the rest of the sub-carriers as depicted in FIG. 2. Pilot tones, if present may be transmitted as required.

When the DTU latency path in a symbol is turned off, all sub-carriers that are assigned to that latency path are muted, e.g., QAM point [0, 0] is mapped onto those sub-carriers.

An OFDM symbol contains hundreds to thousands of sub-carriers (tones). Each sub-carrier is loaded with a certain number of bits used to carry data, and the number of loaded bits per sub-carrier is calculated by a bit-loading algorithm. In the simplified description of the present disclosure, a symbol is partitioned into two parts: one carries overhead portion and the other carries DTUs. However, there may be cases where one sub-carrier carries some bits for overhead portion as well as some bits for DTUs.

The size of a DTU is typically fixed but can vary from tens of bytes to thousands of bytes depending on a number of factors. Therefore, there are occasions when a payload packet spans one DTU while there are other occasions when a payload packet spans a plurality of DTUs.

Figure 7:
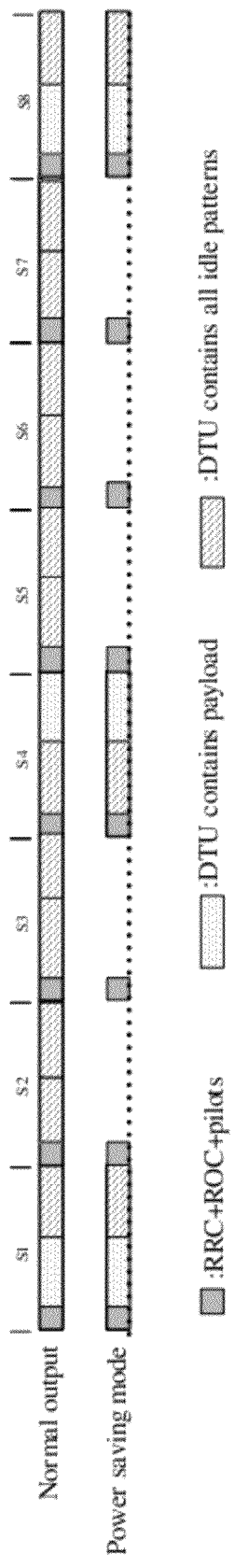
FIG. 7 illustrates a power-saving data communication scheme in accordance with one embodiment of the present disclosure.

FIG. 7 illustrates a power-saving data communication scheme in accordance with one embodiment of the present disclosure. More specifically, FIG. 7 illustrates the output of a normal g.INP transmitter (normal output) and the output of a modified transmitter in accordance with the present disclosure (power saving mode).

In the example shown, each symbol may contain multiple DTUs. For the sake of simplicity and ease of illustrating the point, each symbol contains two DTUs in the example shown in FIG. 7. In this simple case, each symbol contains two DTUs plus an overhead portion that is on a separate latency path. The overhead portion may include, but is not limited to, a fixed RRC and EOC (defined in G.993.2 for VDSL, G.992.3 for ADSL2 and G.993.5 for ADSL2+) although FIG. 7 shows the overhead portion to include RRC and EOC.

As shown in FIG. 7, the overhead portion and the two DTUs of a symbol are transmitted when at least one of the DTUs contains payload data. On the other hand, when both DTUs of a symbol are idle DTUs, i.e., containing all idle patterns, only the overhead portion of the symbol is transmitted but not the idle DTUs. Accordingly, the power consumption of a transmitter of a networking device according to the present disclosure will be approximately proportional to the actual user traffic.

Figure 8:
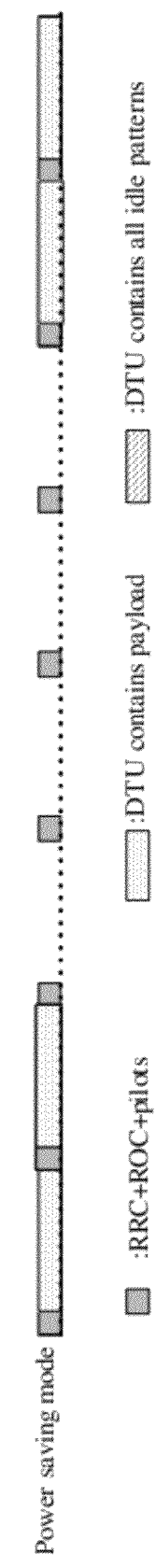
FIG. 8 illustrates a power-saving data communication scheme in accordance with another embodiment of the present disclosure.

FIG. 8 illustrates a power-saving data communication scheme in accordance with another embodiment of the present disclosure. Similar to FIG. 7, FIG. 8 illustrates the output of a normal g.INP transmitter (normal output) and the output of a modified transmitter in accordance with the present disclosure (power saving mode).

In the example shown, a DTU spans over the length of multiple symbols. For the sake of simplicity and ease of illustrating the point, each DTU spans over the length of two symbols in the example shown in FIG. 8. In this simple case, each symbol contains a portion of a respective DTU (i.e., one half of a DTU) plus an overhead portion that is on a separate latency path. The overhead portion may include, but is not limited to, a fixed RRC and EOC.

From the two examples illustrated in FIG. 7 and FIG. 8, it can be seen that the output power is roughly proportional to the number of DTUs that are transmitted. In real scenario the relationship between the total bit-load L1 of the DTU latency path to the size of DTU would be more complicated than the above examples but the same principle applies. Moreover, the sync symbol will be transmitted to enable online reconfiguration (OLR) feature and pilots need to be on if requested by a customer premises equipment (CPE) to ensure a good loop-timing. As a line driver's power consumption is proportional to its output power, the amount of power saved when the payload latency path is muted can be quite significant.

It is noteworthy that the proposed technique will work well for non-trellis mode. If trellis mode is enabled, muting the data latency path completely might cause EOC receive error due to incomplete trellis trailing information. Therefore, in one embodiment an initial vendor discretionary number of sub-carriers mapped to the data latency path L1 are not muted so as to assist decoding of the EOC on latency path L0. Alternatively, trellis code may be applied separately to EOC on latency path L0 and to data latency path L1.

Additionally, it may be desirable to indicate whether or not muted sub-carriers are present in the current symbol. This can simplify the receiver implementation and reduce the unnecessary processing of the muted sub-carriers in the receiver. In one embodiment, a one- or two-byte field similar to RRC that is transmitted once per symbol may be defined to support such function. This field can either be an indication or a cyclic redundancy check (CRC). In another embodiment, since the data mapped to the DTU latency path is idle data for an idle DTU, one or two bytes of that latency path may be used for this field in order to avoid the additional overhead of adding this field in all cases.

It is also noteworthy that it is possible to not mute all of the idle DTUs and that transmission of partially or completely unmuted idle DTUs periodically or upon request by the receiver is allowed for purposes such as, for example, receiver re-synchronization, training or tracking purposes or during signal-to-noise ratio (SNR) calculations in the neighboring loops.

Fourth Illustrative Embodiments

Figure 9:
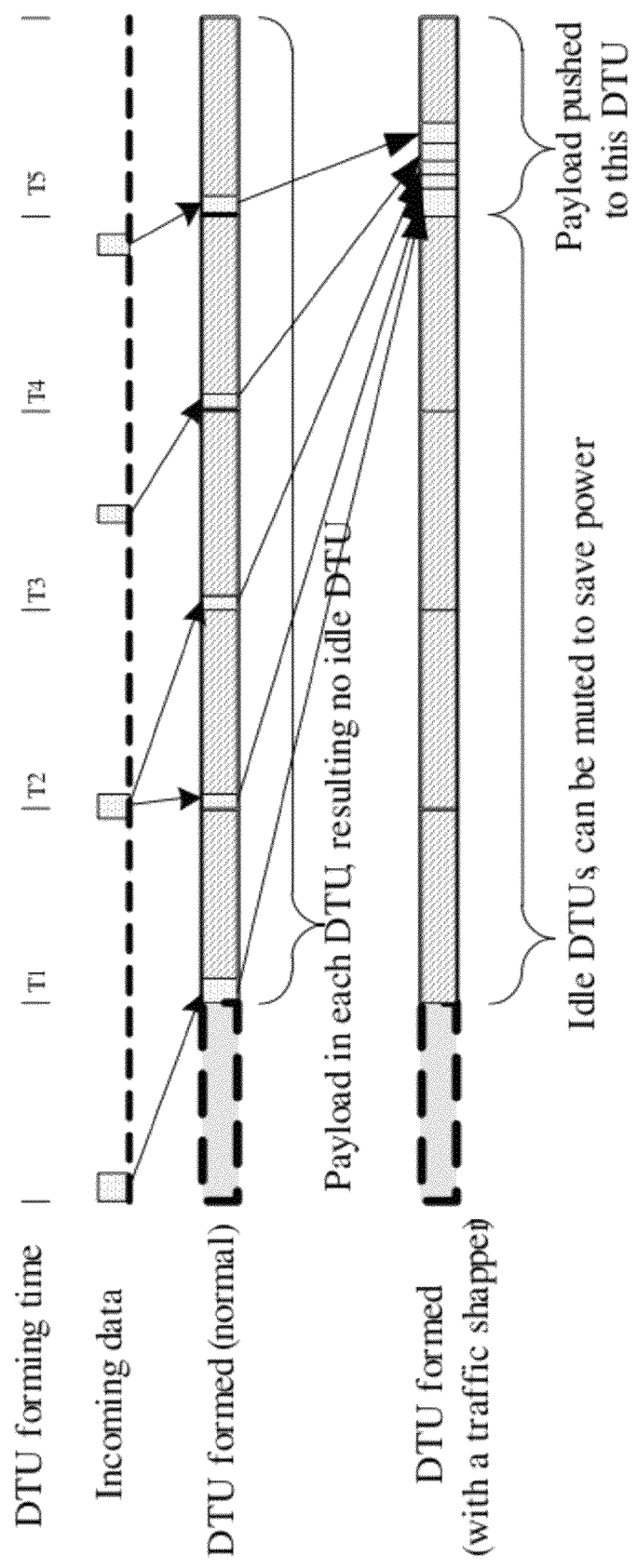
FIG. 9 illustrates a power-saving data communication scheme with respect to Voice over Internet Protocol (VoIP) in accordance with one embodiment of the present disclosure.

FIG. 9 illustrates a power-saving data communication scheme with respect to Voice over Internet Protocol (VoIP) in accordance with one embodiment of the present disclosure. With applications such as VoIP, the user traffic may be sustainable yet at a very low rate and might result in a lot of DTUs with small amount of user data in each of them. This is not desirable if the power-saving scheme described above is implemented. In one embodiment, a traffic shaper may be used. Although the traffic shaper is described with reference to DTUs in the following description, it is to be noted that the technique described herein can be implemented for any aggregate unit of data corresponding to user data traffic and is applicable to devices implementing different standards. With the introduction of a traffic shaper, all user data can be concentrated into one DTU and leave all idle patterns to other DTUs, as shown in FIG. 9.

In FIG. 9, T1 to T5 represent the time that a new DTU is needed to be generated. Without a traffic shaper, the DTU framer collects whatever payload is available at the TPS-TC layer and pads idle patterns if the payload could not fully fill one DTU. The resultant DTUs might have a very small portion of data in each one while the rest are idle patterns. When a traffic shaper is introduced, it observes a maximum PHY delay set by the operator and concentrate all user data into one DTU. In the example shown in FIG. 9, the delay is set to (T5-T1). If the accumulated payload data could not fully fill a single DTU, the traffic shaper sends out idle DTUs until the maximum PHY delay is met. At this point, the traffic shaper puts all accumulated payload in one DTU and fills the remaining DTUs with idle patterns to complete the remaining DTUs. As it can be seen from FIG. 9, with a traffic shaper more idle DTUs are formed and power can be saved by muting the sub-carriers carrying idle DTUs.

As shown in FIG. 9, some of the data packets, i.e., payload data, may each correspond to a respective one of the DTUs while other data packets may each correspond to more than one of the DTUs. In the example shown in FIG. 9, the first incoming data packet corresponds to the first DTU formed at time T1, the second incoming data packet corresponds to the second and third DTUs formed at time T2 and time T3, the third incoming data packet corresponds to the fourth DTU formed at time T4, and the fourth incoming data packet corresponds to the fifth DTU formed at time T5. Without a traffic shaper, the five DTUs would be transmitted with each DTU carrying the respective data packet (or a portion thereof) even though a good portion of each DTU contains no payload data. With a traffic shaper, however, the four data packets are concentrated into the DTU formed at time T5. As a result, the first four DTUs can be rendered as idle DTUs and thus muted to save power, while the four data packets are transmitted in the fifth DTU.

Illustrative Implementation as Methods

Figure 10:
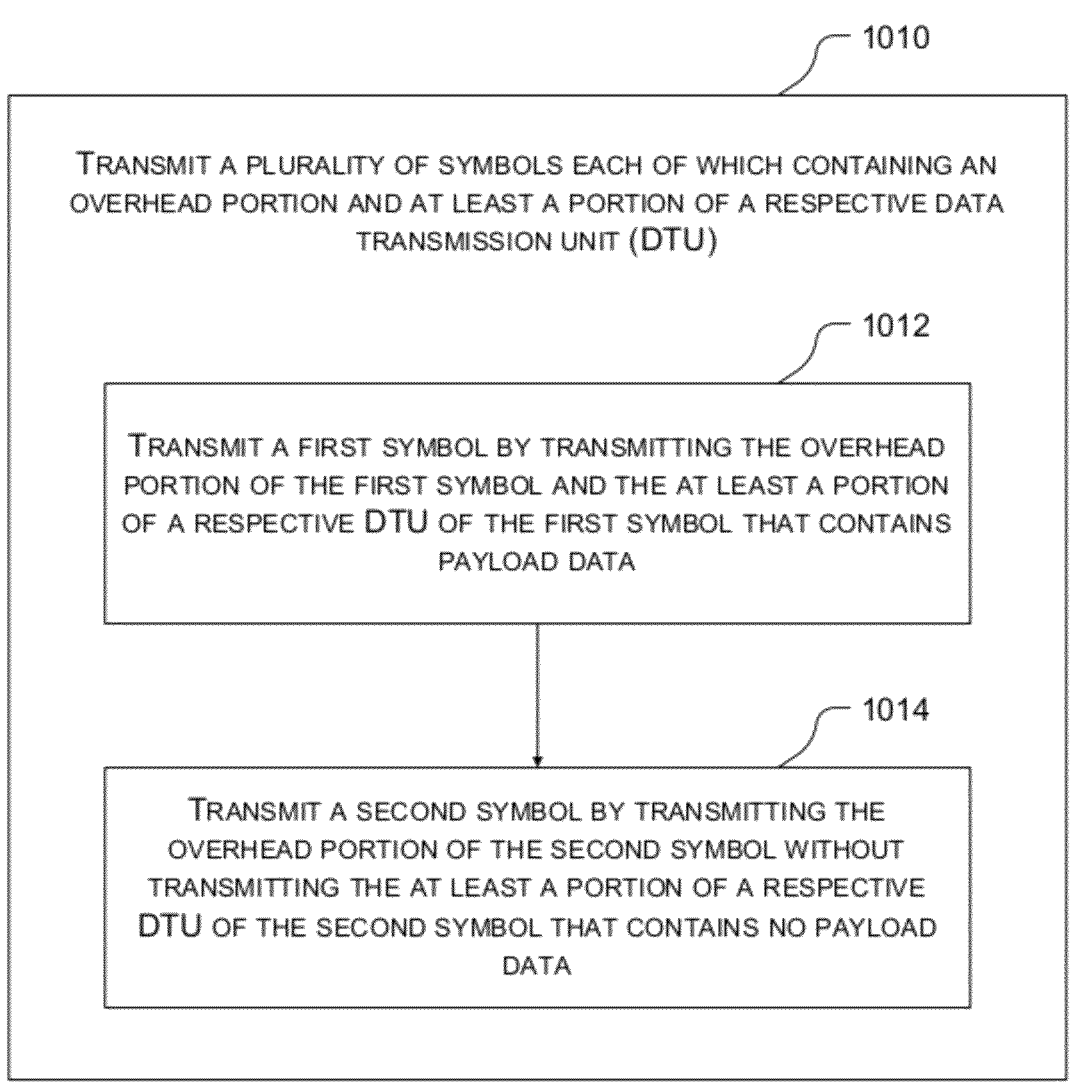
FIG. 10 is a block diagram of a method to save power in data communication in accordance with one embodiment of the present disclosure.

FIG. 10 is a block diagram illustrating a method 1000 to save power in data communication in accordance with one embodiment of the present disclosure.

At 1010, the method 1000 transmits a plurality of symbols each of which containing an overhead portion and at least a portion of a respective DTU. In particular, at 1012, the method 1000 transmits the overhead portion of a first symbol of the plurality of symbols and the at least a portion of a respective DTU of the first symbol when the at least a portion of the respective DTU of the first symbol contains payload data. At 1014, the method 1000 transmits the overhead portion of a second symbol of the plurality of symbols without transmitting the at least a portion of a respective DTU of the second symbol when the at least a portion of the respective DTU of the second symbol contains no payload data.

In one embodiment, each symbol may contain a respective plurality of DTUs. Transmitting the overhead portion of a second symbol of the plurality of symbols without transmitting the at least a portion of a respective DTU of the second symbol when at least a portion of the respective DTU of the second symbol contains no payload data may comprise transmitting the overhead portion of the second symbol without transmitting the respective plurality of DTUs of the second symbol when each of the respective plurality of DTUs of the second symbol contains no payload data.

In one embodiment, the transmitting may comprise transmitting in accordance with Very-high-speed Digital Subscriber Line 2 (VDSL2) standards.

In one embodiment, the method may further comprise determining whether or not a first DTU that corresponds to one or more of the plurality of symbols contains no payload data; and marking the first DTU to indicate the first DTU as containing no payload data when it is determined that the first DTU contains no payload data. Marking the first DTU may comprise setting a value of a sequence identification (SID) in the overhead portion of the first DTU to 255. Alternatively, marking the first DTU may comprise setting a value of a time stamp (TS) in the overhead portion of the first DTU to 255 and a value of a sequence identification (SID) in the overhead portion of the first DTU to 255.

In another embodiment, the method may further comprise setting a value of a sequence identification (SID) or both a value of a time stamp (TS) and a value of the SID in the overhead portion of each symbol to indicate a nature of content of the at least a portion of a respective DTU of each symbol. The value of the SID may be set to 255, or that both the value of the TS may be set to 255 and the value of the SID may be set to 255, to indicate the at least a portion of a respective DTU of a symbol as containing no payload data. Alternatively, the value of the TS may be set to 255 and the value of the SID may be set to 254 to indicate the at least a portion of a respective DTU of a symbol will be transmitted once and not stored in a retransmission queue or a transmitter.

Figure 11:
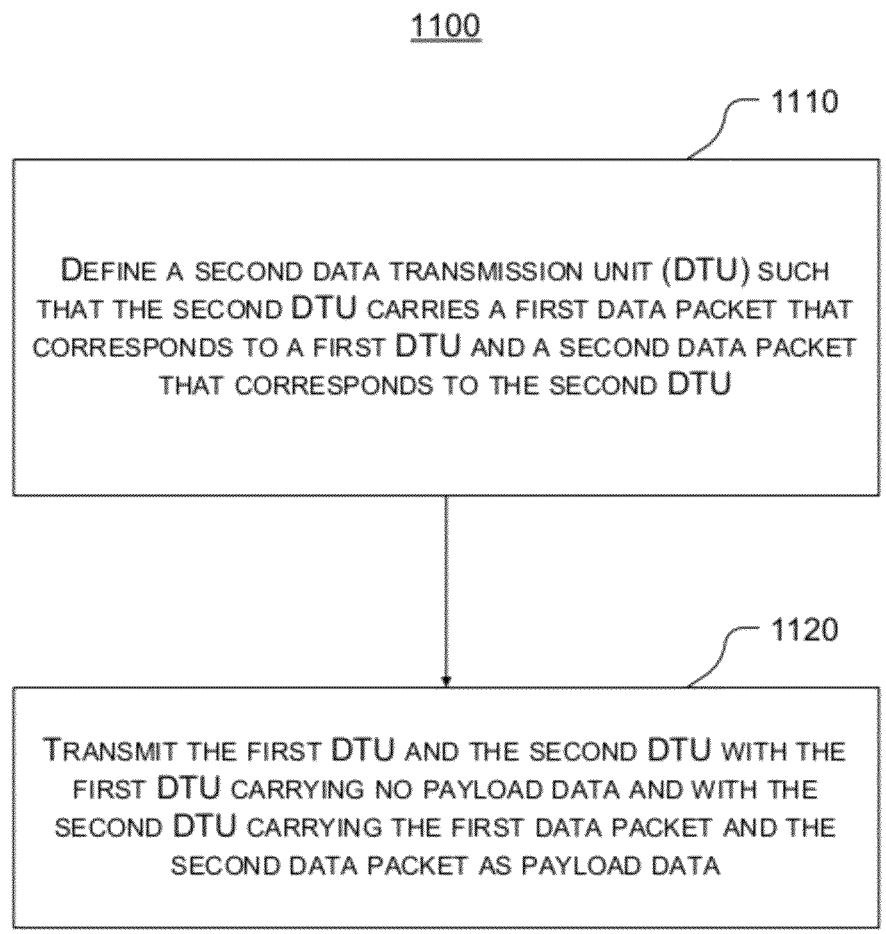
FIG. 11 is a block diagram of a method to save power in data communication in accordance with another embodiment of the present disclosure.

FIG. 11 is a block diagram illustrating a method 1100 to save power in data communication in accordance with another embodiment of the present disclosure.

At 1110, the method 1100 defines a second DTU such that the second DTU carries a first data packet that corresponds to a first DTU and a second data packet that corresponds to the second DTU. At 1120, the method 1100 transmits the first DTU and the second DTU with the first DTU carrying no payload data and with the second DTU carrying the first data packet and the second data packet as payload data.

In one embodiment, the first data packet may correspond to the first DTU and a third DTU. The first DTU, the second DTU, and the third DTU may be transmitted with the first DTU and the third DTU carrying no payload data and with the second DTU carrying the first data packet and the second data packet as payload data.

In another embodiment, the first data packet and the second data packet may comprise first and second Voice over Internet Protocol (VoIP) data packets.

Illustrative Networking Device

Figure 12:
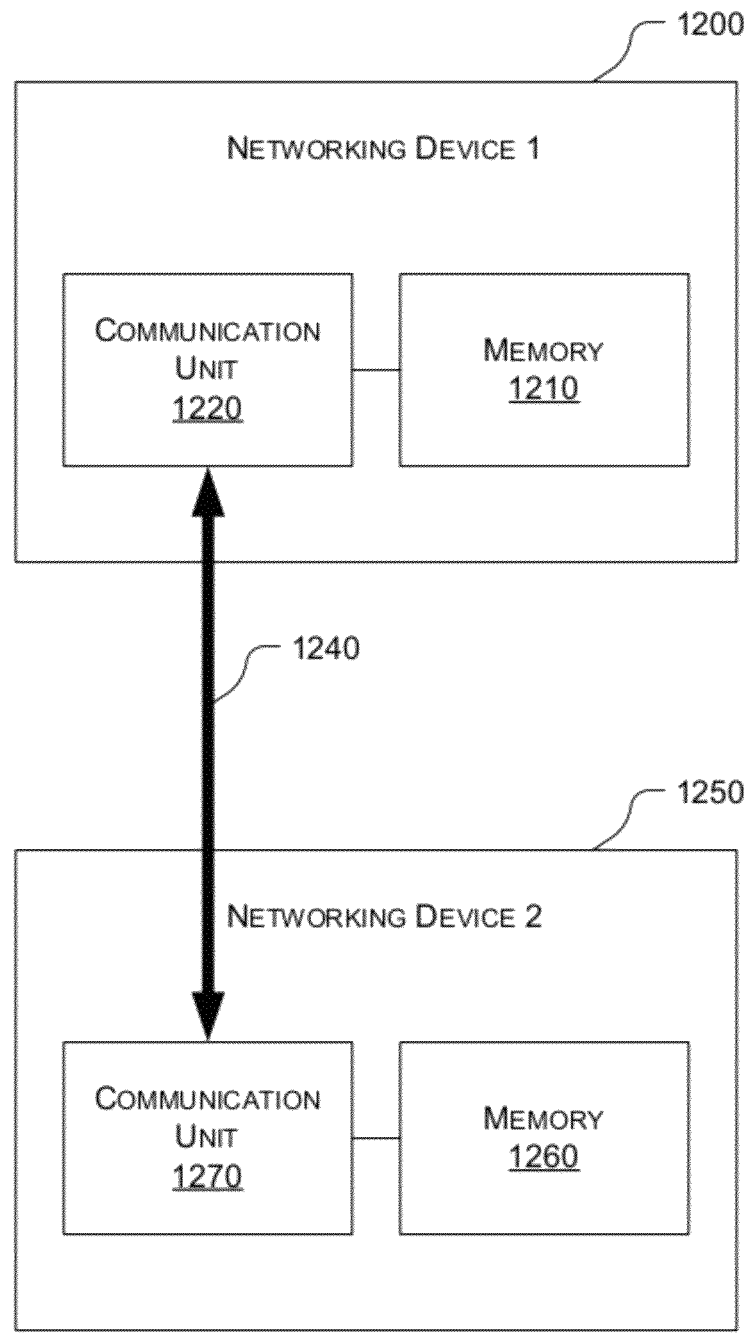
FIG. 12 is a block diagram of a networking device capable of implementing a power saving scheme in accordance with the present disclosure.

FIG. 12 illustrates an exemplary networking device 1200 capable of implementing the power saving scheme in accordance with the present disclosure, including the method 1000 and the method 1100.

As shown in FIG. 12, the networking device 1200 comprises memory 1210 and a communication unit 1220 coupled to memory 1210. The communication unit 1220 may comprise a transmitter implementing one or more of the retransmission functional models 100, 400, 500 and 600 of FIGS. 1, 4, 5 and 6. Alternatively, the communication unit 1020 may comprise a transceiver implementing one or more of the retransmission functional models 100, 400, 500 and 600 of FIGS. 1, 4, 5 and 6. The networking device 1200 may be communicatively coupled to a networking device 1250 via a communication medium 1240. The communication medium may be power line, coaxial cable, twisted-pair phone line, powerline, Ethernet, optical fiber, or a combination thereof. The networking device 1250 comprises memory 1260 and communication unit 1270.

The communication unit 1220 may be configured to transmit a plurality of symbols each of which containing an overhead portion and at least a portion of a respective DTU by: transmitting the overhead portion of a first symbol of the plurality of symbols and the at least a portion of a respective DTU of the first symbol when the at least a portion of the respective DTU of the first symbol contains payload data, and transmitting the overhead portion of a second symbol of the plurality of symbols without transmitting the at least a portion of a respective DTU of the second symbol when the at least a portion of the respective DTU of the second symbol contains no payload data.

In one embodiment, each symbol may contain a respective plurality of DTUs. The communication unit 1220 may transmit the overhead portion of the second symbol without transmitting the respective plurality of DTUs of the second symbol when each of the respective plurality of DTUs of the second symbol contains no payload data.

In one embodiment, the communication unit 1220 may be further configured to determine whether or not a first DTU that corresponds to one or more of the plurality of symbols contains no payload data; and mark the first DTU to indicate the first DTU as containing no payload data when it is determined that the first DTU contains no payload data. The communication unit 1220 may mark the first DTU by setting a value of a SID in the overhead portion of the first DTU to 255. Alternatively, the communication unit 1220 may mark the first DTU by setting a value of a TS in the overhead portion of the first DTU to 255 and a value of an SID in the overhead portion of the first DTU to 255.

In another embodiment, the communication unit 1220 may be further configured to define a second DTU such that the second DTU carries a first data packet that corresponds to a first DTU and a second data packet that corresponds to the second DTU, and transmit the first DTU and the second DTU with the first DTU carrying no payload data and with the second DTU carrying the first data packet and the second data packet as payload data. The first data packet may correspond to the first DTU and a third DTU. The first DTU, the second DTU, and the third DTU may be transmitted with the first DTU and the third DTU carrying no payload data and with the second DTU carrying the first data packet and the second data packet as payload data. The first data packet and the second data packet may comprise first and second Voice over Internet Protocol (VoIP) data packets.

In one embodiment, the networking device 1200 is a VDSL2-based networking device. However, it will be readily appreciated that the techniques disclosed herein may be implemented in other xDSL-based apparatus, system or environment. The networking device 1200 shown in FIG. 12 is only one example of a networking device and is not intended to suggest any limitation as to the scope of use or functionality of the computer and network architectures. When implemented in a network environment, such as a VDSL2 network, the networking device 1200 may perform the functions described above, including the method 1000 and the method 1100.

Depending on the exact configuration and type of networking device, memory 1210 may be volatile (such as RAM), non-volatile (such as ROM, flash memory, etc.) or some combination thereof.

It is appreciated that the illustrated networking device 1200 is only one example of a suitable apparatus and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like.

The above-described techniques pertain to power saving for communication systems. Although the techniques have been described in language specific to structural features and/or methodological acts, it is to be understood that the appended claims are not necessarily limited to the specific features or acts described. Rather, the specific features and acts are disclosed as exemplary forms of implementing such techniques. Furthermore, although the techniques may have been described in the context of data communications with respect to the g.INP standard and VDSL2, the techniques may be applied in any other suitable context, such as g.fast, other xDSL-based communication systems, and other OFDM-based communication systems.

What is claimed is:

1. A method to save power in data communication, the method comprising:
    transmitting a plurality of symbols each of which containing an overhead portion and at least a portion of a respective data transmission unit (DTU) by:
        transmitting a first symbol of the plurality of symbols which includes the overhead portion and the at least a portion of a respective DTU of the first symbol when the at least a portion of the respective DTU of the first symbol contains payload data; and
        transmitting a second symbol of the plurality of symbols which includes the overhead portion without allocating power in a frequency spectrum to sub-carriers associated with the at least a portion of a respective DTU of the second symbol when the at least a portion of the respective DTU of the second symbol contains no payload data.

2. The method as recited in claim 1, wherein each symbol contains a respective plurality of DTUs, and wherein transmitting a second symbol of the plurality of symbols which includes the overhead portion without allocating power in a frequency spectrum to sub-carriers associated with the at least a portion of a respective DTU of the second symbol when the at least a portion of the respective DTU of the second symbol contains no payload data comprises transmitting the second symbol which includes the overhead portion without allocating power in the frequency spectrum to the sub-carriers associated with the respective plurality of DTUs of the second symbol when each of the respective plurality of DTUs of the second symbol contains no payload data.

3. The method as recited in claim 1, wherein the transmitting comprises transmitting in accordance with Very-high-speed Digital Subscriber Line 2 (VDSL2) standards.

4. The method as recited in claim 1, further comprising:
    determining whether or not a first DTU that corresponds to one or more of the plurality of symbols contains no payload data; and
    marking the first DTU to indicate the first DTU as containing no payload data when it is determined that the first DTU contains no payload data.

5. The method as recited in claim 4, wherein marking the first DTU comprises setting a value of a sequence identification (SID) in the overhead portion of the first DTU to 255.

6. The method as recited in claim 4, wherein marking the first DTU comprises setting a value of a time stamp (TS) in the overhead portion of the first DTU to 255 and a value of a sequence identification (SID) in the overhead portion of the first DTU to 255.

7. The method as recited in claim 1, further comprising:
setting a value of a sequence identification (SID) or both a value of a time stamp (TS) and a value of the SID in the overhead portion included in each symbol to indicate a nature of content of the at least a portion of a respective DTU of each symbol.

8. The method as recited in claim 7, wherein the value of the SID is set to 255, or the value of the TS is set to 255 and the value of the SID is set to 255, to indicate the at least a portion of a respective DTU of a symbol as containing no payload data.

9. The method as recited in claim 7, wherein the value of the TS is set to 255 and the value of the SID is set to 254 to indicate the at least a portion of a respective DTU of a symbol will be transmitted once and not stored in a retransmission queue or a transmitter.

10. A method to save power in data communication, the method comprising:
defining a second data transmission unit (DTU) such that the second DTU carries a first data packet that corresponds to a first DTU and a second data packet that corresponds to the second DTU; and
transmitting the first DTU and the second DTU without allocating power in a frequency spectrum to sub-carriers associated with the first DTU, the first DTU carrying no payload data and the second DTU carrying the first data packet and the second data packet as payload data.

11. The method as recited in claim 10, wherein the first data packet corresponds to the first DTU, the second data packet corresponds to the second DTU and a third data packet corresponds to the third DTU, and wherein the first DTU, the second DTU, and the third DTU are transmitted without allocating power in the frequency spectrum to the sub-carriers associated with the first DTU and second DTU, the first DTU and the second DTU carrying no payload data and with the third DTU carrying the first data packet, the second data packet and the third data packet as payload data.

12. The method as recited in claim 10, wherein the first data packet and the second data packet comprise first and second Voice over Internet Protocol (VoIP) data packets.

13. A networking device comprising:
memory; and
a communication unit coupled to the memory, the communication unit configured to:
transmit a plurality of symbols each of which containing an overhead portion and at least a portion of a respective data transmission unit (DTU) by:
transmitting a first symbol of the plurality of symbols which includes the overhead portion and the at least a portion of a respective DTU of the first symbol when the at least a portion of the respective DTU of the first symbol contains payload data; and
transmitting a second symbol of the plurality of symbols which includes the overhead portion without allocating power in a frequency spectrum to sub-carriers associated with the at least a portion of a respective DTU of the second symbol when the at least a portion of the respective DTU of the second symbol contains no payload data.

14. The networking device as recited in claim 13, wherein each symbol contains a respective plurality of DTUs, and wherein the communication unit transmits the second symbol which includes the overhead portion without allocating power in the frequency spectrum to sub-carriers associated with the respective plurality of DTUs of the second symbol when each of the respective plurality of DTUs of the second symbol contains no payload data.

15. The networking device as recited in claim 13, wherein the communication unit is further configured to:
determine whether or not a first DTU that corresponds to one or more of the plurality of symbols contains no payload data; and
mark the first DTU to indicate the first DTU as containing no payload data when it is determined that the first DTU contains no payload data.

16. The networking device as recited in claim 15, wherein the communication unit marks the first DTU by setting a value of a sequence identification (SID) in the overhead portion of the first DTU to 255.

17. The networking device as recited in claim 15, wherein the communication unit marks the first DTU by setting a value of a time stamp (TS) in the overhead portion of the first DTU to 255 and a value of a sequence identification (SID) in the overhead portion of the first DTU to 255.

18. The networking device as recited in claim 13, wherein the communication unit is further configured to:
define a second DTU such that the second DTU carries a first data packet that corresponds to a first DTU and a second data packet that corresponds to the second DTU; and
transmit the first DTU and the second DTU without allocating power in the frequency spectrum to the sub-carriers associated with the first DTU, the first DTU carrying no payload data and the second DTU carrying the first data packet and the second data packet as payload data.

19. The networking device as recited in claim 18, wherein the first data packet corresponds to the first DTU, the second data packet corresponds to the second DTU and a third data packet corresponds to the third DTU, and wherein the first DTU, the second DTU, and the third DTU are transmitted without allocating power in the frequency spectrum to the sub-carriers associated with the first DTU and the second DTU, the first DTU and the second DTU carrying no payload data and with the third DTU carrying the first data packet, the second data packet and the third data packet as payload data.

20. The networking device as recited in claim 18, wherein the first data packet and the second data packet comprise first and second Voice over Internet Protocol (VoIP) data packets.

* * * * *